(12) United States Patent
Odenthal et al.

(10) Patent No.: US 6,694,706 B1
(45) Date of Patent: Feb. 24, 2004

(54) FACILITY AND METHOD FOR FILLING PRODUCT RECEPTACLES WITH PRODUCTS

(75) Inventors: Heinz Odenthal, Zülpich (DE); Herbert Schulte, Euskirchen (DE)

(73) Assignee: Nor-Reg A/S, Honefoss (NO)

( * ) Notice: Subject to any disclaimer, the term of this patent is extended or adjusted under 35 U.S.C. 154(b) by 0 days.

(21) Appl. No.: 09/959,371

(22) PCT Filed: Apr. 19, 2000

(86) PCT No.: PCT/EP00/03544

§ 371 (c)(1),
(2), (4) Date: Jan. 7, 2002

(87) PCT Pub. No.: WO00/63077

PCT Pub. Date: Oct. 26, 2000

(Under 37 CFR 1.47)

(30) Foreign Application Priority Data

| Apr. 19, 1999 | (DE) | ......................................... 199 17 655 |
| Apr. 19, 1999 | (DE) | ......................................... 199 17 656 |
| Apr. 19, 1999 | (DE) | ......................................... 199 17 657 |

(51) Int. Cl.$^7$ .................. B65B 21/06; B65B 35/44; B65B 35/50

(52) U.S. Cl. ................. 53/443; 53/534; 53/495; 53/201; 53/235; 53/244; 53/247

(58) Field of Search ................ 53/446, 447, 448, 53/475, 493, 534–544, 495, 201, 235, 239, 242, 244, 245, 246, 247, 255, 259; 83/102

(56) References Cited

U.S. PATENT DOCUMENTS

| 3,902,587 | A | * | 9/1975 | Checcucci | ............... 198/419.3 |
| 4,238,024 | A | | 12/1980 | Hirakawa et al. | |
| 4,718,534 | A | * | 1/1988 | Harper | ....................... 198/401 |
| 4,864,801 | A | * | 9/1989 | Fallas | ........................... 53/446 |
| 5,044,143 | A | * | 9/1991 | Ako et al. | .................... 53/448 |
| 5,078,255 | A | * | 1/1992 | Haley | ......................... 198/358 |
| 5,430,994 | A | * | 7/1995 | Focke et al. | ................... 53/493 |
| 5,460,481 | A | | 10/1995 | Prakken | |
| 5,588,285 | A | * | 12/1996 | Odenthal | ..................... 53/534 |
| 5,615,762 | A | * | 4/1997 | Dyess | ..................... 198/464.1 |
| 5,778,640 | A | * | 7/1998 | Prakken et al. | ................ 53/475 |
| 6,145,281 | A | * | 11/2000 | Hansen et al. | ................ 53/447 |
| 6,519,503 | B2 | * | 2/2003 | Paterson et al. | ............ 700/226 |
| 6,546,698 | B1 | * | 4/2003 | Focke et al. | .................... 53/447 |

FOREIGN PATENT DOCUMENTS

DE    G 94 10 970.2    8/1994

* cited by examiner

*Primary Examiner*—Rinaldi I. Rada
*Assistant Examiner*—Hemant M. Desai
(74) *Attorney, Agent, or Firm*—Herbert Dubno

(57) ABSTRACT

The invention relates to a facility and method for filling product receptacles (1), especially cartons, with a predetermined amount of products (2), especially flexible bag packaging, which are individually fed at regular or irregular intervals and assembled to form a group of products (11) and which are subsequently fed to an available product receptacle (1). The products (2) in the group of products (11) can be selectively placed on or under the preceding product. The group of products (11) can be selectively fed to the product receptacles (1) vertically or horizontally.

46 Claims, 5 Drawing Sheets

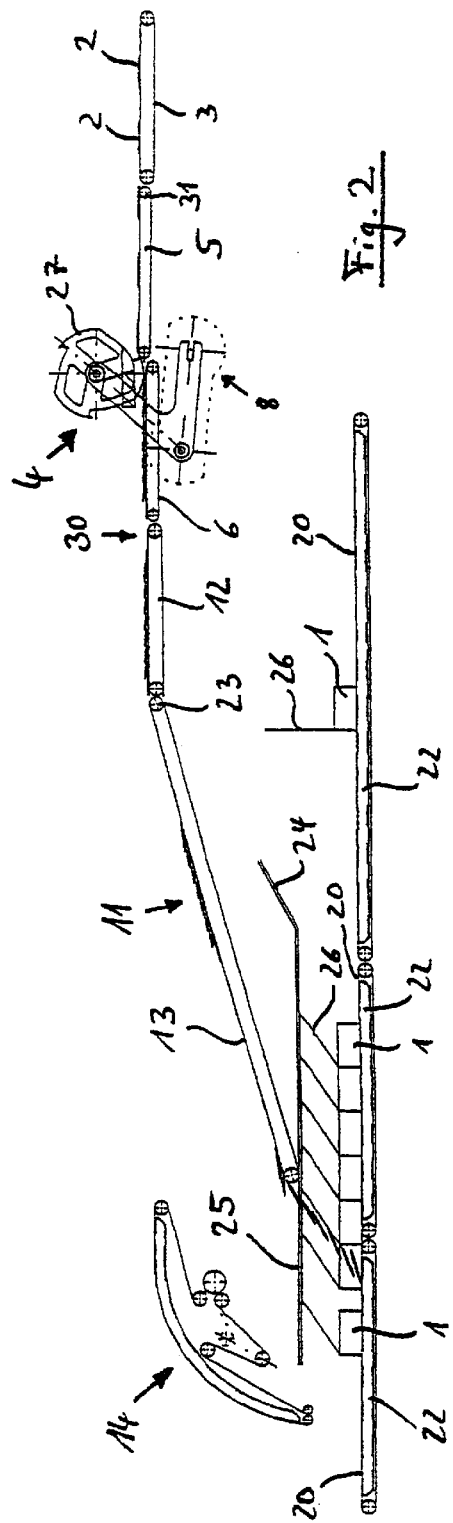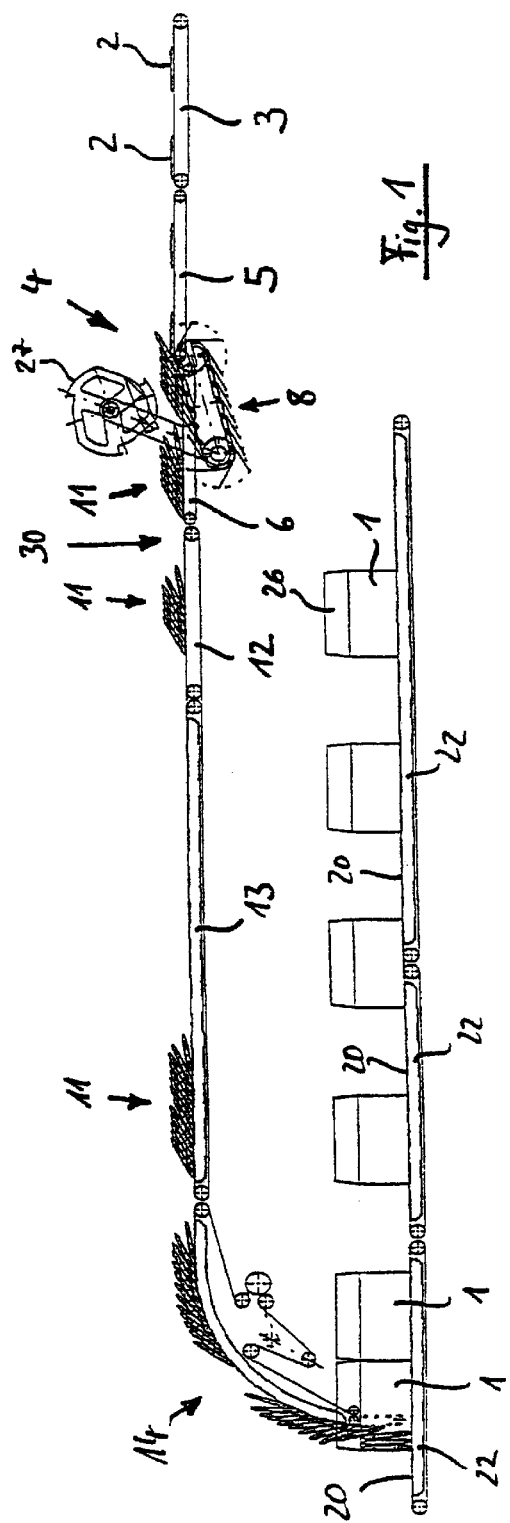

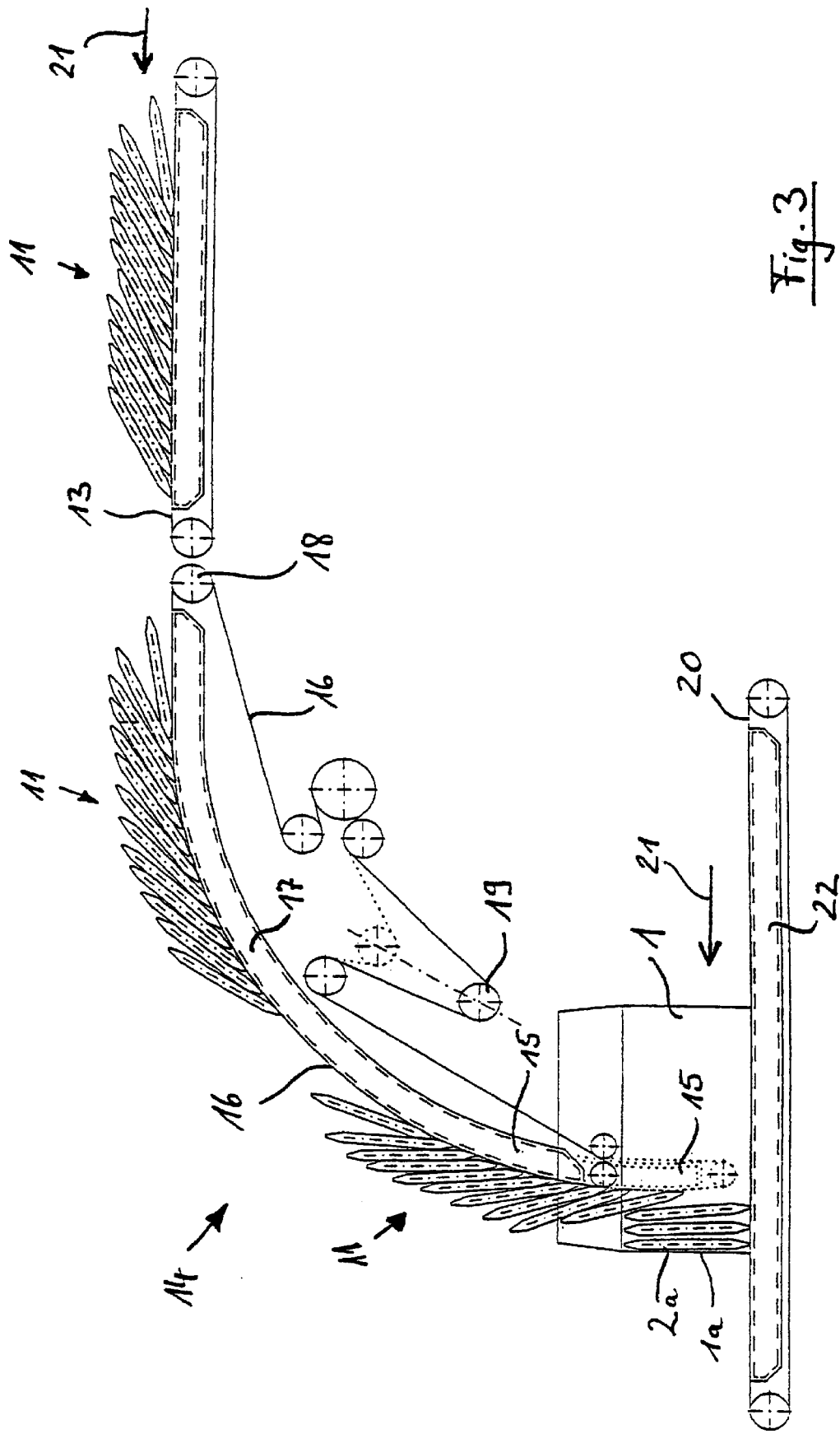

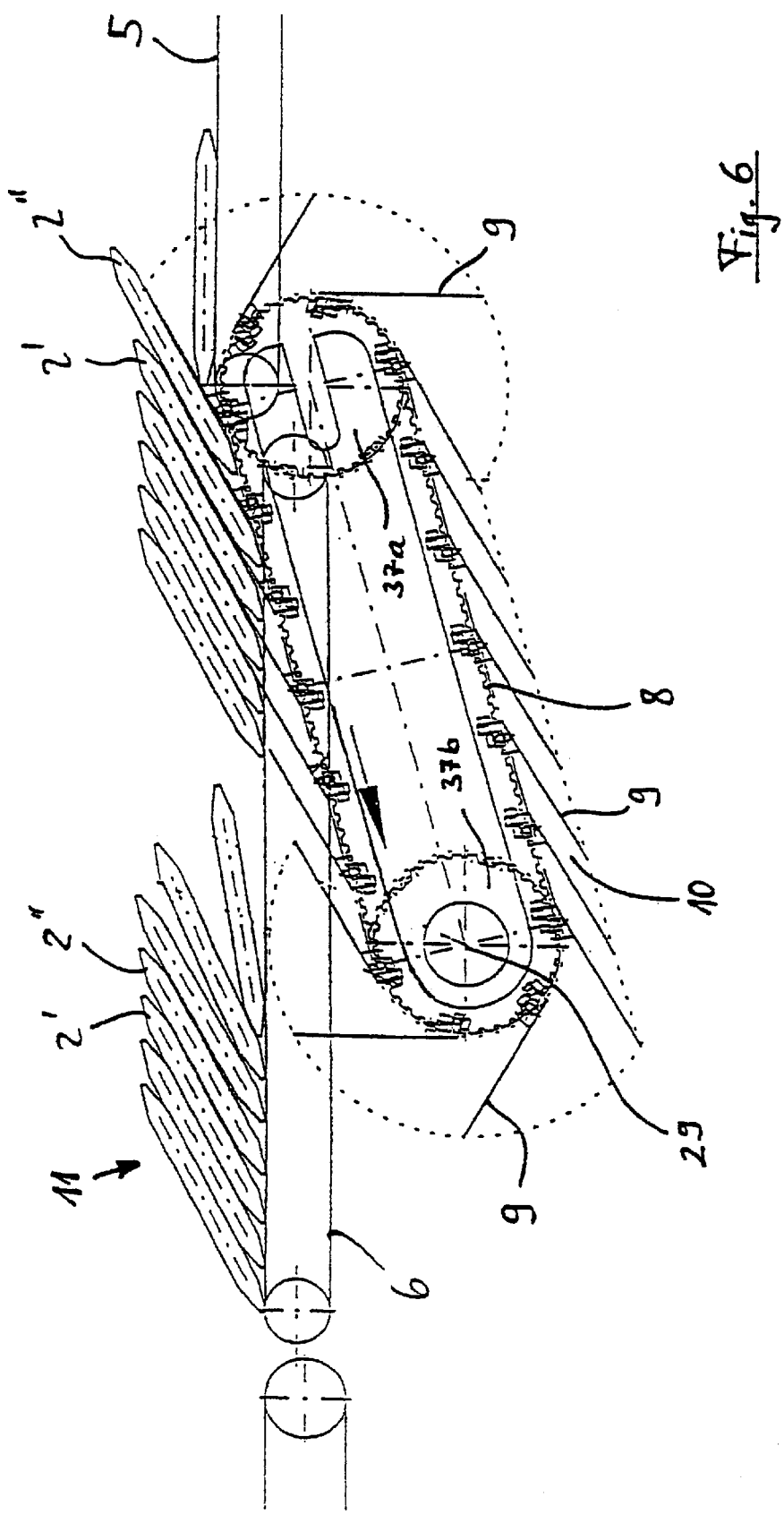

FACILITY AND METHOD FOR FILLING PRODUCT RECEPTACLES WITH PRODUCTS

BACKGROUND OF THE INVENTION

The invention relates to an installation for filling, respectively feeding product receptacles with a predetermined number of products, particularly of flexible packaging bags, which are supplied individually or at regular or irregular intervals and are brought together to form scale-shaped batches of overlapping products, and which subsequently are fed to a prepared receptacle. The invention further relates to an installation for implementing the method with a feeding conveyor, by means of which the products can be individually fed to the installation, with a scaling station wherein the products can be arranged in batches overlapping in a scale-like manner, and with a filling conveyor by means of which the products can be delivered to a product receptacle positioned in a filling station, as well as with a product receptacles conveyor, by means of which the product receptacles can be fed to and discharged from the filling station.

Such an installation and such a method are known from the German Utility Model G 9410970. With this installation packaging bags filled with unstable goods are introduced vertically standing next to each other into packaging cartons. Although the method of the invention, respectively the installation of the invention is preferably used with flat packaging bags, it is also possible to be used with other stackable products, for instance boxes or cartons.

In G 9410970 the bags are fed individually to the installation via a horizontally running feeding conveyor. Then they are transferred to a second conveyor belt, which is driven at a lower speed than the belt of the feeding conveyor. As a result the bags are first arranged scale-like to overlap forming a batch, so that each bag partially overlaps the preceding bag. After a defined number of bags have been scaled to form a batch, the transport speed of the second conveyor belt is temporarily increased, whereby a spacing between the first batch of bags and the next batch of bags is created.

Subsequently the bag batches are transported over an arc-shaped filling projection with a lower strap which moves the bags from the horizontal into the vertical position and introduces them into the packaging cartons. However hereby an additional shielding upper strap is required, which holds the bags against the lower strap. Particularly at its free ends the upper strap, which extends lower downward than the lower strap, prevents the individual bags in the packaging from tipping over from the vertical position into the carton part which is still free. The upper strap rests thereby on the lower strap guided by the filling projection, so that the transported bags become clamped between the upper strap and the lower strap.

This type of upper strap causes not only considerable additional expenses, but it can also damage the pressure-sensitive goods contained in the bags, because of the pressure it exerts on the lower strap. Besides with this known installation it is not possible to introduce the bags horizontally into a carton.

There are known installations by means of which bags can be introduced horizontally into a carton, but with these installations it is not possible to introduce the bags vertically into the cartons.

It is therefore the object of the invention to devise a simple and quick process, as well as a constructively simple, cost-effective and easy to handle installation of the kind mentioned in the introduction, which with flexible use possibilities and reduced space requirements makes it possible to fill the products into the cartons in horizontal as well as vertical position, and which facilitates a careful filling of the products into the product receptacles at a very high output.

According to the invention, this object is achieved by means of an installation as defined in claim 1, respectively through a process as claimed in claim 42. It is thereby essential that the products arranged in a scale-like fashion in a product group can be selectively placed on or under the preceding product. It is also essential in the installation of the invention that the filling conveyor comprises means by which the product groups can be fed to the product receptacles either vertically or horizontally.

This way a high degree of flexibility is achieved in filling the product receptacles. A vertical as well as a horizontal feeding is possible. The space requirement of an installation according to the invention is reduced, because the conveying means and the conveying paths, as well as the filling position are at least substantially the same for both filling types. It is possible to reach very high outputs of up to 600 products per minute filled carefully and safely into the products receptacles.

An essential advantage of the invention consists in that the upper strap used to secure the product batches can be eliminated also during vertical feeding, when the products are fed into receptacles in an overlapping scale-like manner, so that each product lies under the preceding product. Thereby the filling operation can be started with the inside of the product receptacle facing the upper side of the first product of a product batch. During the filling process the filling conveyor is moved up to the opposite side of the product receptacle. This way each individual product is held on one side by the already introduced products (respectively the first product by the inner side of the frontal wall of the packaging receptacle) and on the other side by the filling conveyor, so that there is no danger of toppling over. Also in this scaling arrangement the filling conveyor does not require an additional upper strap for securing the products, so that damage to the products, especially to the goods contained in the packaging bags due to high pressure forces is avoided.

Although the method of the invention, respectively the installation of the invention, is preferably used for flat packaging bags, it is also possible to use it in other stackable products, for instance boxes or cartons.

In an installation whose filling conveyor for vertical feeding comprising a filling projection with a perforated filling belt, by means of which the product groups can be switched from a horizontal into a vertical conveying direction, it is particularly advantageous to guide the feeding belt over a negative pressure chamber extending over the entire length of the filling projection. Thereby a particularly secure hold of the products on the filling projection can be insured even at very high speeds.

In a preferred embodiment the filling projection together with the negative pressure chamber can be swung about, out of the product receptacle, around a horizontal axis, so that after a product receptacle is completely filled, a further product receptacle can be positioned under the filling projection, particularly by means of a conveyor belt.

For a horizontal feeding of the product receptacle it is advantageous when the filling conveyor has a conveyor belt swingable about a horizontal axis, by means of which the product batches can be fed horizontally to the product receptacles. Advantageously this conveyor belt can be arranged before a filling projection of the previously described kind. Thereby for the vertical feeding of the product receptacles in a horizontal position, the filling projection can connect with the scaling station, respectively for the horizontal feeding of the product receptacles in an inclined position it can lead directly into or to a product receptacle.

It is particularly advantageous when the scaling station comprises an incoming conveyor belt and an outgoing conveyor belt, whereby in the transfer area between the two conveyor belts delaying means are provided for reducing the product speed and means for lifting and/or shifting the products into the position required for scaling. This way a controlled, quick and safe scaling in the desired direction is possible.

From the European patent EP 0 331 210 a process and a device are known for forming a product strand of several products, particularly of flat flexible bags, which are fed individually by means of an incoming conveyor belt and are positioned to overlap in a scale-like manner onto an outgoing conveyor belt and delivered as a product strand, whereby the outgoing conveyor belt for the formation of a product strand is driven with a speed lower than the speed of the incoming conveyor belt and whereby, for the formation of a gap between two product strands, the outgoing conveyor belt is driven with a higher speed. Thereby several flat bags are folded together to overlap in a scale-like manner to form a product strand (product batch), so that each bag lies partially on top of the preceding bag.

In this known process, respectively device, the individual bags on an incoming conveyor belt are transferred onto an outgoing conveyor belt, which runs at a lower speed and is slightly lower located. At the transfer point between these two conveyor belts, the bags are neither guided nor supported but fly in a free fall onto the outgoing conveyor belt, respectively onto the preceding bag. Thereby a precise positioning of the bags in the bag strand is not always insured. Particularly at high or very high outputs, also in the case of very high conveyor belt speeds or of bags filled with loose material, whose centers of gravity vary during production, the bags can land in undefined positions and can be displaced in the conveying direction and/or laterally or turn by an angle. These undefined bag positions can lead to disturbances in the subsequent production process, particularly when the bags are packaged in cartons, which can result in a standstill of the entire installation and thereby to additional high costs. Furthermore additional problems occur in a product change, particularly when the size, the surface structure, the weight and/or the weight distribution changes depending on various bag contents, the products land in different positions. Therefore when the product changes considerable rearrangements become necessary, which are related to expensive startups. The flexibility and cost-effectiveness of the entire installation are thereby considerably limited.

It is therefore desirable to create a simple, quick and reliable process, as well as an installation of the aforementioned kind, which is constructively simple, cost-efficient and easy to handle, which even at very high outputs, as well as with constantly changing products can insure a safe deposition of the products in the required position.

According to the invention, such a process provides that the product speed at the transfer point between the incoming conveyor belt and the outgoing conveyor belt is reduced, that at the transfer point between the incoming conveyor belt and the outgoing conveyor belt the advancing edge of the product in the conveying direction is lifted and/or that the trailing edge of the product in the conveying direction is lowered, that the products in this position are brought to partially overlap the preceding products, and that subsequently the products are superposed on the preceding product.

This makes impossible a flight of products in free fall, and thereby an undefined landing of the products. Even at very high outputs of up to 600 products per minute, each product is deposited precisely in the required position, so that disturbances in the following processing due to imprecise product positions are eliminated.

In the corresponding device according to the invention it is essential to provide at the transfer point between the incoming conveyor belt and he outgoing conveyor belt delaying means for reducing the product speed and lifting means for lifting the advancing edge of the products in conveying direction. The delaying and lifting means can be separate or can constitute a unit.

With a simple construction such a device insures a safe and precise positioning of the products even at high speeds. It is easy to handle and can be produced and operated at low cost.

In an preferred embodiment the delaying means and the lifting means are formed as unit by a scaling wheel which at its periphery has several notches for receiving the advancing product edge. The products are fed by the incoming conveyor belt into the preferably shovel-shaped notches and safely guided and held in the required position in the product strand up to their deposition. Thereby the path of the products it stricty defined at any moment. The notches can thereby open outwards in radial or tangential direction. In an alternate embodiment a chain or belt can also be provided as delaying and/or lifting means.

It is advantageous when the scaling wheel is rotatable about an axis which is at least approximately parallel to the axes of the guide rollers of the conveyor belts. This prevents the products from being laterally deflected. A particularly simple construction can be achieved when the scaling wheel is arranged above the conveyor belts. Thereby it is advantageous for the processing of products with various sizes when the distance between the scaling wheel and the conveyor belts can be variably adjusted.

It is particularly advantageous when the scaling wheel is driven particularly by a separately controllable or adjustable drive, so that the peripheral speed lies between the conveying speed of the incoming conveyor belt and that of the outgoing conveyor belt. Preferably a servo motor is used as a drive. The peripheral speed of the scaling wheel determines the product speed.

Advantageously two to eight notches with the same orientation can be evenly distributed over the periphery of the scaling wheel. A particularly good product guidance is achieved with three notches.

It is particularly advantageous when the notches are arranged at least substantially tangential at the periphery of the scaling wheel and the outer diameter of the scaling wheel continuously increases in an area between two notches from the radial inner limit of a notch to the radial outer limit of the neighboring notch. Thereby this area can extend only over part or over the entire peripheral stretch between two notches. The area increasing in its diameter serves as a stop, which safely deposits the products on the respective preceding product.

It is possible to provide advantageously an additional reliable lateral guidance of the product when the scaling wheel has a smaller width than he products. Then it is also possible in a preferred embodiment to provide a guide element above the outgoing conveyor belt, on one or both frontal sides next to the scaling wheel, as a stop for a lateral edge of the product projecting beyond the scaling wheel. This can prevent the product from being lifted too far from the outgoing conveyor belt. Thereby it is particularly advantageous when at the rear end of the guide element in the conveying direction of the product a downwards directed projection is provided, which insures the maximal guidance of the advancing product edge in horizontal direction.

It is particularly advantageous when the incoming conveyor belt and/or the outgoing conveyor belt is swingable about a substantially horizontal axis remote from the transfer point. This way the height difference between the two conveyor belts at the transfer point can be variably adjusted depending on product size.

In a preferred embodiment, the delaying means and lifting means are arranged slidably and/or swingably, so that they can be removed from the area of the transfer point. This way different scaling means can be brought into the process flow at the transfer point between the two conveyor belts, so that for instance a different scaling direction can be produced.

In the process and the corresponding device known from the previously mentioned European patent EP 0331 210 for the formation of a product strand of several products, particularly flat flexible bags, which by means of an incoming conveyor belt are individually fed and brought to overlap in a scale-like manner onto an outgoing conveyor belt and delivered as a product strand, several flat bags are arranged to overlap in a scale-like manner to form a product batch, so that each bag lies partially on top of the preceding bag.

In this known process, respectively device, only this described type of scaling can take place. On the contrary, it is not possible to produce a scaling where each bag lies partially under the preceding bag. Such a type of scaling offers various advantages for instance for the following packaging processes. So for instance in a vertical feeding of the bags into a carton, the upper covering belt required in conventional scaling for holding the bags on the feeding conveyor can be eliminated.

Besides due to the free fall of the individual bags at the transfer point described in the aforementioned EP 0 331 210 disadvantages occur which limit the flexibility and cost-effectiveness of the entire installation.

It is therefore desirable to create a simple, quick and reliable process, as well as a device which is constructively simple, cost-effective and easy to handle for producing a scaling whereby a product lies under the respectively preceding product, and which insures even at high outputs and with frequently changing products a safe deposition of the products in the required position.

According to the invention, such a process provides that the speed of the products at the transfer point between the incoming conveyor belt and the outgoing conveyor belt be reduced, that at the transfer point between the incoming conveyor belt and the outgoing conveyor belt the trailing edge of the product in conveying direction be lifted and/or the advancing edge of the product in the conveying direction be lowered, so that the products are brought in this position under a part of the preceding product, and that the products are subsequently positioned onto the outgoing conveyor belt.

Thereby a reversed scaling is produced, in which each products lies to a considerable extent under the respectively preceding product. Also the products are deposited safely, so that a flight of the products in free fall and thereby an undefined landing of the product are safely precluded. Even at very high outputs for instance of 600 products per minute each product is precisely positioned in the required position, so that disturbances in the subsequent process due to undefined product positions are eliminated.

In the device of the invention it is essential to provide delaying means for reducing the speed of the products and lifting means for lifting the trailing edge of the products in conveying direction, in the area of the transfer point between the incoming conveyor belt and the outgoing conveyor belt. The delaying and lifting means can be separate or can constitute a unit.

Such a device with a simple construction insures a safe and precise positioning of the products in the desired scaling direction, even at very high conveyor outputs. It is easily handled and can be produced and operated in a cost-effective manner.

It is particularly advantageous when the delaying means and the lifting means are formed as single unit by at least one traction means on which severally outwards pointing entrainment elements are arranged, which between them form pockets for receiving the products. The products are fed into the pockets by the incoming conveyor belt and are safely guided and held until they are deposited in the required position in the product strand. Thereby the path of the products is precisely defined at any moment.

In a preferred embodiment the entrainment elements are arranged at an acute angle to the surface of the traction means, whereby the pockets are inclined in the direction of the products fed by the incoming conveyor belt. Thereby the inclination required for the desired scaling is imparted to the products.

It is particularly advantageous when the entrainment elements are detachably mounted on the traction means. This insures a quick and simple adjustment to various product sizes.

In a preferred embodiment the traction means is a chain running around two sprocket wheels. But also belts or similar traction means can be used according to the invention.

It is particularly favorable when the chain runs at an angle from the first sprocket wheel arranged at the transfer point between the incoming conveyor belt and the outgoing conveyor belt, obliquely downward in the transport direction of the products towards the second sprocket wheel. This way the entrainment elements can be pulled out downward between the individual products in a very simple manner, after the products, scaled in the desired manner, have been deposited on the outgoing conveyor belt.

Thereby an adjustment to various product sizes can take place in that the angle of the entrainment element and/or the angle of the chain is adjustable.

In a preferred embodiment of the invention the scaling produced on the outgoing conveyor belt is particularly safely detached from the entrainment elements of the traction means, in that the traction means is driven by a particularly separate control or adjustment device, so that the speed component of the entrainment element and pockets corresponds in horizontal direction to the speed of the outgoing conveyor belt.

It is advantageous when 10 to 16 entrainment elements are evenly distributed over the traction means. In a preferred variant 20 entrainment elements are provided.

In an alternative embodiment the delaying means and the lifting means can also be formed by at least one scaling wheel supported underneath the conveyor belts, which has several notches for receiving the products or the advancing edge of the products.

It is particularly advantageous when the circumference of the first pinion, respectively the circumference of the scaling wheel is located at least at its upper area closely to the height of the incoming conveyor belt. This insures a particularly safe and frictionless accommodation of the products.

A lateral deflection of the products can be advantageously prevented in that the axes, around which the traction means runs, respectively around which the scaling wheel turns, are at least approximately parallel to the axes of the guide rollers of the conveyor belts.

In a preferred embodiment on each of the two sides of the conveyor belts a traction means, respectively a scaling wheel is arranged, by means of which the lateral edges of the products protruding beyond the conveyor belts can be seized. However it is also possible to subdivide the conveyor belts in two lateral partial belts and to provide a traction means, respectively scaling wheel, between them.

It is particularly advantageous when the incoming conveyor belt and/or the outgoing conveyor belt is swingable around an axis remote from the transfer point which runs at least approximately horizontally. This way the height difference between the two conveyor belts at the transfer point can be variably adjusted depending on the product size.

In a preferred embodiment, the delaying means and lifting means are arranged slidable and/or swingably so that they can be removed from the area of the transfer point. This way at the transfer point between the two conveyor belts also other scaling means are brought into the process flow, for instance in order to produce a conventionl scaling direction, whereby each product lies on top of the respectively preceding product.

It is particularly favorable when between the feeding conveyor and the scaling station a compensation conveyor belt is provided. Advantageously its length is at least twice the length of the product.

Further it is advantageous when an intermediate conveyor belt is provided between the scaling station and the feeding conveyor. Thereby the intermediate conveyor belt and the outgoing conveyor belt together are preferably at least as long as the length of a product batch.

By means of the compensating conveyor belt and/or the intermediate conveyor belt the product batches, as well as the gaps between batches can be safely formed even at very high outputs, without stopping, delaying or influencing in any way the feeding of the products into the installation or the filling of the product receptacles with product batches.

According to the invention, a particularly space-saving arrangement can be achieved by arranging the product receptacle conveyor so that the product receptacles in the installation travel in the same direction with the products. Further particularly simple logistics in the feeding and discharge of the products and the product receptacles is included, when the transport direction of the product receptacles and the direction of the product flow coincide in the installation.

It is particularly advantageous when the conveyor and the conveyor belts, as well as the driven means of the scaling station, are driven either individually or in pairs by separate drives, particularly servo motors. This way the various aggregates and means can be driven with the same or with a different speed from each other. As a result the installation can be quickly and simply adjusted to various formats of products and/or product receptacles through a corresponding control of the drives. Expensive mechanical resetting operations are thereby not required.

The space requirements at high outputs can be further heightened in that at least two independently operating feeding paths, each with a feeding conveyor, a scaling station and a filling conveyor and a product receptacle conveyor are arranged next to each other.

SUMMARY OF THE INVENTION

A process according to the invention for filling product receptacles, particularly cartons, with a predetermined number of products, particularly flexible bag packages, which are supplied individually at regular or irregular intervals and are arranged overlappingly in a scale-like product batch, and which subsequently are fed to a prepared product receptacle, particularly by means of an installation as previously described, is characterized in that during scaling the products of a product batch are selectively positioned either on top or under the respectively preceding product, and that subsequently the product batches are selectively fed to the product receptacle either vertically or horizontally.

Preferably the products of a product batch are arranged scale-like in such a manner that each product lies on top of the preceding product, when the products of a product batch are fed horizontally to the product receptacles.

Further the products of a product batch are thereby arranged in a scale-like manner so that one product lies under the preceding product, when the products of a product batch are fed vertically to the product receptacles.

BRIEF DESCRIPTION OF THE DRAWINGS

Further advantages and features of the invention result from the dependent claims, as well as from the following description of the embodiments represented in the drawing.

It shows:

FIG. 1: a schematic representation of the basic elements of an installtion according to the invention during vertical filling FIG. 2: a schematic representation of the basic elements of the installation during horizontal feeding, FIG. 3: an enlarged representation of the filling conveyor in FIG. 1

FIG. 6: an enlarged partial representation of the scaling means in FIG. 4.

DESCRIPTION OF THE PREFERRED EMBODIMENT

Figure 4:
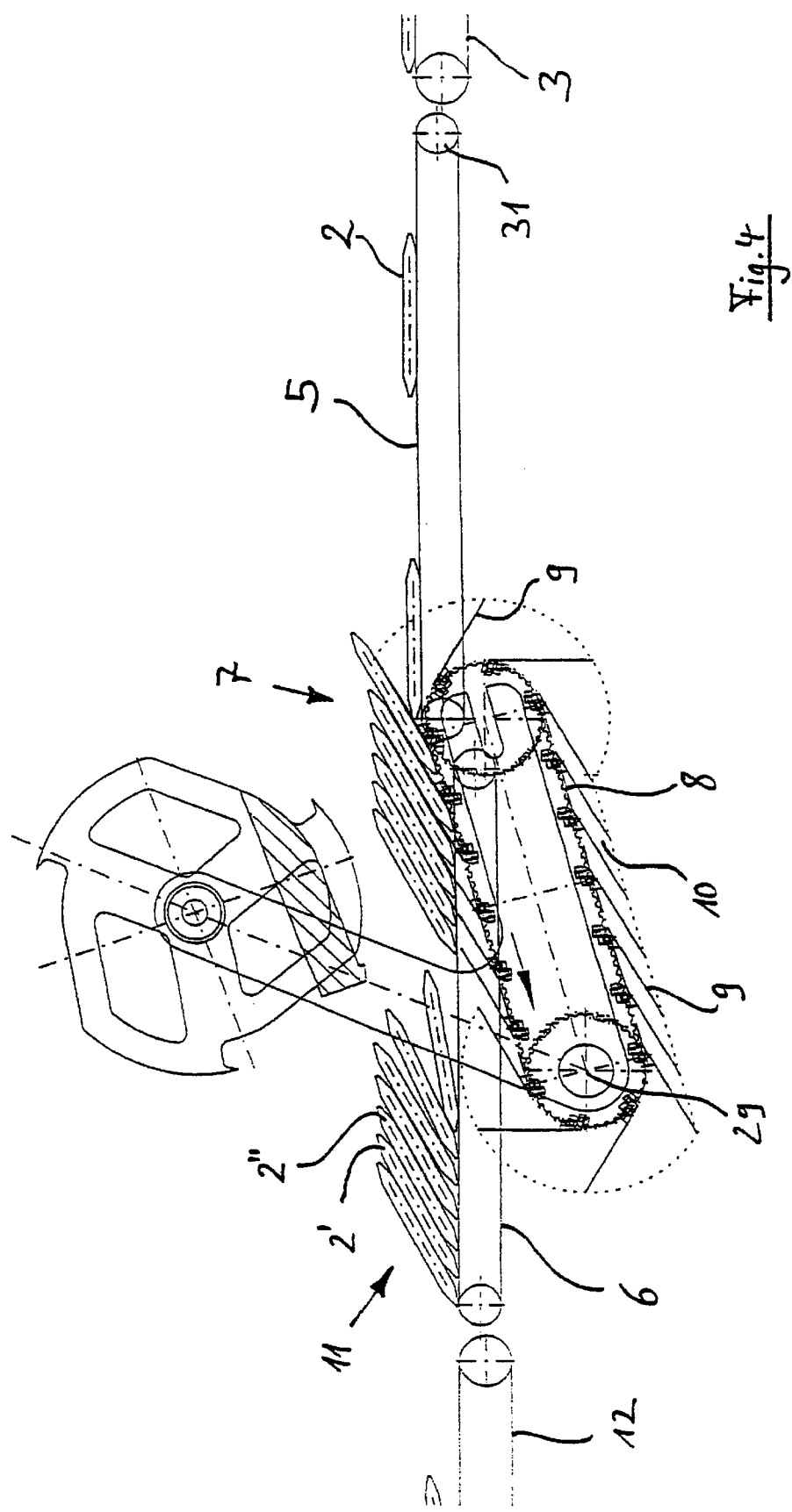
FIG. 4: embodiment examples of scaling means
Figure 5:
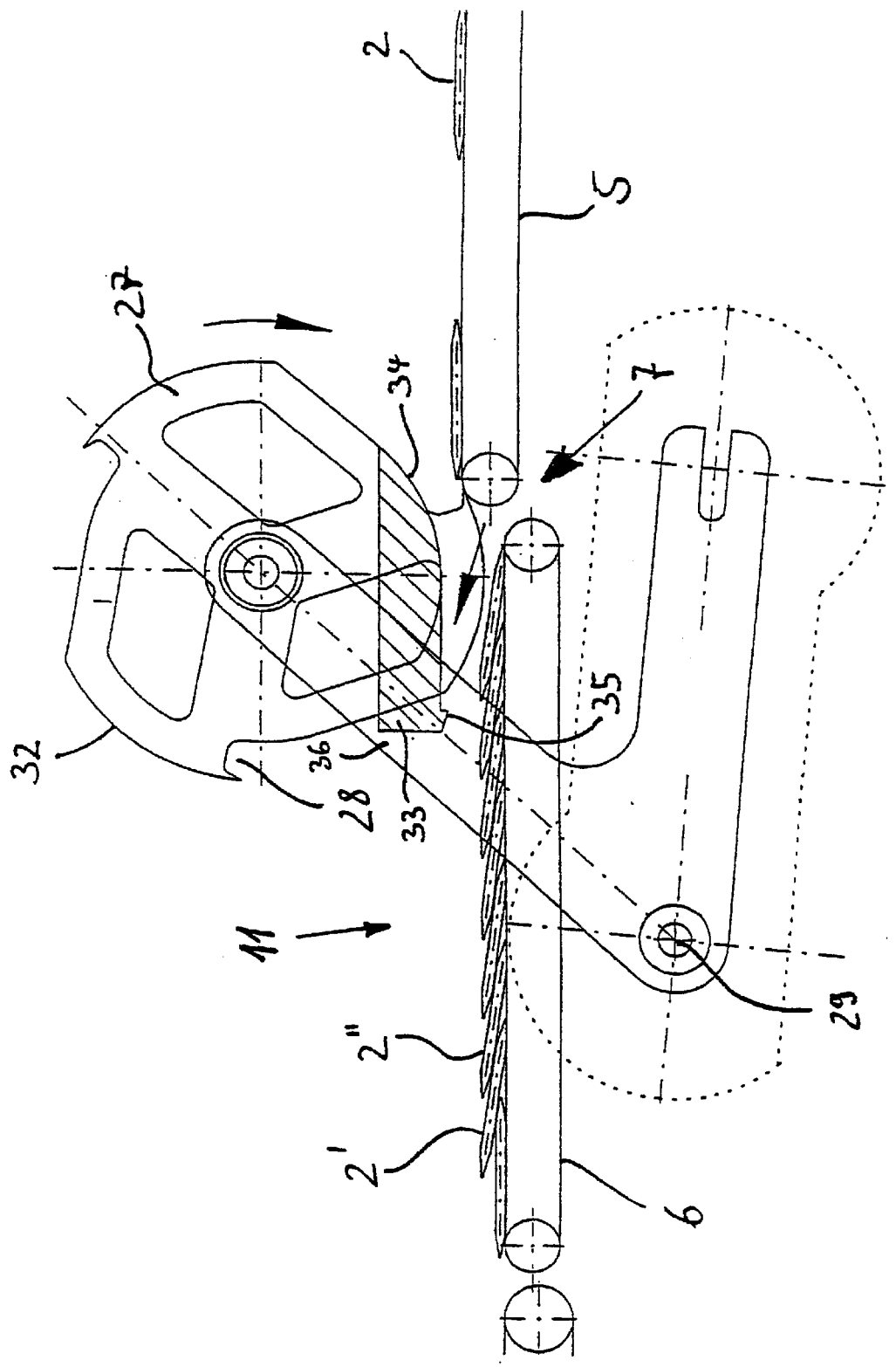
FIG. 5: a further embodiment examples of a scaling means

The installation serves for filling cartons 1 with flexible bag packages 2, which are filled with loose goods, for instance powder. Thereby the installation is connected to a filling and closing machine for filling the goods into the bags 2, which is not shown in the drawing, as well as to a machine for erecting the cartons 1, also not illustrated.

The bags 2 are fed to the installation individually at variable, but at least approximately regular intervals, via a feeding conveyor not shown in the drawing. First they are transferred to a horizontally running compensating conveyor belt 3. This is followed by a scaling station 4, which has an incoming conveyor belt 5 and a subsequently arranged outgoing conveyor belt 6.

At the transfer point 7 between these two conveyor belts 5, 6 there is an obliquely downward running chain 8 with several outward slanted entrainment elements 9, which between them form receiving pockets 10 for the bags 2. The bags 2 transported by the incoming conveyor belt 5 are received by the chain 8 in such a manner that a substantial portion of each bag 2" lies under the respectively preceding bag 2'. In this scaled position the bags 2 are subsequently deposited as a product batch 11 onto the outgoing conveyor belt 6.

From the outgoing conveyor belt 6 the batches 11 are transferred to an intermediate conveyor belt 12 and by the latter are transferred to a filling conveyor belt 13. The filling conveyor belt 13 is followed by a basically known filling conveyor 14 with a bent filling projection 15, wherein a perforated filling belt 16 is guided over a negative pressure chamber 17. The filling conveyor 14 is swingable about the axis 18 facing the scaling station 4, so that the filling projection 15 can be moved into the cartons 1, respectively out of the cartons 1. In order to offset length differences, the filling belt 16 is guided over several guide rollers 19, which are supported partially slidable by pressure means.

In the carton 1 located in the area of the filling projection 15 the bags 2 of a bag batch 11 are deposited vertically. In the embodiment example shown in FIG. 3 the first bag is introduced at the left side 1a of the carton 1. The following bags 2 are each introduced into the carton 1 to the right next to the preceding bag 2. Thereby each bag 2 is supported in each position either by the carton walls, by neighboring bags 2 or by the lower free end of the filling projection 15, so that no bag 2 can topple over. The carton 1 is thereby transported underneath the filling projection 15 towards the left by means of a conveyor belt 20, so that the carton 1 moves in the same direction 21 as the bags 2 in the transport line 3, 5, 6, 12, 13 of the installation. The conveyor belt 20 is also perforated and guided over a negative pressure chamber 22.

In the installation shown in FIG. 2, cartons 1 are filled with bags 2 lying horizontally on top of each other. For this purpose the filling conveyor belt 13 is swung obliquely downward about its axis 23 which is close to the scaling station 4, so that the bag batches 11 are not guided towards the filling conveyor 14, but are guided by the filling conveyor 13 directly into the cartons 1. At the free end of the filling conveyor belt 13 the bags 2 of batch 11 fall flatly on top of each other into the carton 1 prepared to being filled. In the filling area above the cartons 1, a guide rail 25 with a sloped inlet 24 is laterally provided, which brings the lid 26 of the carton 1 into an inclined, semi-open position. This position of the lids 26 gives addional guidance to the individual bags 2 during the filling of the carton 1.

In this type of horizontal carton filling, at the transfer point 7 of the scaling station 4 between the incoming conveyor belt 5 and the outgoing conveyor belt 6, a scaling wheel 27 is used having at its periphery shovel-like notches 28 arranged tangentially which engage with the bags 2. The bags 2 coming over the incoming conveyor belt 5 are scaled by the scaling wheel 27 in such a manner that a considerable portion of each bag 2" lies on top of the respectively preceding bag 2'. In this scaled position the bags 2 are subsequently deposited on the outgoing conveyor belt 6 as bag batches 11.

The scaling wheel 27 and the chain 8 are supported in the scaling station 4 swingably about an axis 29, so that they can selectively engage with the bags 2 fed via the incoming conveyor belt 5. Due to this swinging motion which can be quickly performed, the type of scaling can be changed in a simple manner, which results in a high flexibility of the installation. The chain 8 and the scaling wheel 27 can be driven by a common servo motor, whereby also the scaling means 8, 27 not needed at the moment continue to be moved.

The number of the supplied bags can be established by the installation control by means of a detector preceding or following the compensating conveyor belt 3. When the desired number of bags 2 have formed a batch 11, by means of the installation control system the outgoing conveyor belt 6 and the intermediate conveyor belt 12 are driven for a short time at a higher speed, so that a gap 30 is formed preceding the following bag batch 11.

In the following the construction, arrangement and the modus operandi of the scaling wheel 27 are closer described: The incoming conveyor belt 5 is swingable about the axis of the guide roller 31 for the purpose of adjustment to various bag thicknesses, and runs slightly lifted upwards in the shown position. After the incoming conveyor belt 5, the bags 2 are transferred to the outgoing conveyor belt 6 running at a lower speed, on which are they deposited as bag batches 11, respectively as bag strands.

At the transfer point 7 the outgoing conveyor belt 6 is positioned slightly lower than the incoming conveyor belt 5. The outgoing conveyer belt 6 is followed by the intermediate conveyor belt 2 for discharging the bag batches 11.

Above the transfer point 7 between the two conveyor belts 5, 6 there is a scaling wheel 27 provided as a delaying and lifting means for the individual bags 2. At the periphery of the scaling wheel 27 three notches 28 are arranged, which in tangential direction face the advancing bag edge. The scaling wheel 27 is driven by a servomotor. Its peripheral speed is thereby lower than the conveying speed of the incoming conveyor belt 5, so that the bags 2 are delayed by entering the notches 28 of the scaling wheel 27.

After passing the lower dead point of the scaling wheel 27, the advancing edges of bags 2 are slightly guided upwards with the notches 28, so that the bags 2 are brought into an inclined position. In this position each bag 2" is positioned with a considerable portion on top of the respectively preceding bag 2'. This deposition of the bags 2 is supported by the rear areas 32, where the diameter of the scaling wheel 27 increases continuously up to the next notch 28. A free fly or fall of the bags 2 does not occur thereby.

The scaling wheel 27 has a smaller width than the bags 2. Above the outgoing conveyor belt 6, on each of the sides next to the scaling wheel 27 a guide element 33 is arranged as an upper stop for the edges of the bags 2 laterally protruding beyond the scaling wheel 27. On their frontal side facing the incoming conveyor belt 5 the guide elements 33 have in inlet bevel or an inlet rounding 34 and at the rear end a downward directed projection 35, which defines the maximal guidance of the advancing bag edge in horizontal direction.

The scaling wheel 27 is supported on the arm 36 swingable about the horizontal axis 29, so that its vertical distance to the conveyor belts 5, 6 is variably adjustable. Also the scaling wheel 27 can be removed so far from the conveyor belts 5, 6 that its notches 28 no longer engage with the bags 2. When the scaling wheel 27 is in a sufficiently upwards removed position, the chain 8 is made to engage with the bags 2 as a second scaling means instead of the scaling wheel 27, which makes possible a reversed scaling, whereby the a following bag 2" lies under the respectively preceding bag 2'. Thereby for both scaling means 8, 27 a single drive and a single control can be used, since the process is in essence the same.

In order to form a gap between the individual product batches 11, the device is controlled in the manner described below. By means of a sensor or detector, for instance a light barrier, the supplied or scaled bags 2 are counted in a counting device. When the desired number of bags 2 is reached, which can be programmed at liberty, the compensating conveyor belt 3 is first accelerated with the last and the one before last bag of the just formed batch 11. Subsequently the compensating conveyor belt 3 with the first and second bag 2 of the following bath 11 is delayed. Independently therefrom the incoming conveyor belt 5 runs continuously at constant speed. This way on the incoming conveyor belt 5, a gap is created between the last bag 2 of the just formed batch 11 and the first bag of the next batch 11.

Since the last two bags 2 of the just formed batch 11 have a shorter distance to the respectively preceding bag 2 due to the previous acceleration of the compensating conveyor belt 3, the speeds of the scaling wheel 27 and of the outgoing conveyor belt 6 are increased, in order to enable them to receive the two last bags 2. These increased speeds of the scaling wheel 27 and of the outgoing conveyor belt 6 are maintained when the previously produced gap reaches the scaling wheel 27 via the incoming conveyor belt 5. This way between the bag batches 11 a gap, respectively a time interval, is created, which can be used for the various actions of the following process steps. Only when the first bags 2 of the next batch 11 reach the scaling wheel 27, the speed of the scaling wheel 27 and of the outgoing conveyor belt 6 are again reduced to its previous value.

Subsequently the construction, arrangement and modus operandi of the chain 8 as a scaling means is closer described: The incoming conveyor belt 5 is swingable about the axis of the guide roller 31 and runs sloping lightly upwards. Downstream of the incoming conveyor belt 5 the bags 2 are transferred to the outgoing conveyor belt 6 running at a slower speed, where they are deposited as a bag batch 11, respectively a bag strand. At the transfer point 7, the outgoing conveyor belt 6 is positioned slightly lower than the incoming conveyor belt 5. The outgoing conveyor belt 6 is followed by the intermediate conveyor belt 12 for discharging the bag batches 11.

Underneath the transfer point 7 between the two conveyor belts 5, 6, there is a chain 8 revolving around two sprocket wheels 37 as delaying and lifting means for the individual bags 2. On the chain 9 eighteen entrainment elements 9 are arranged, which between each two entrainment elements 9 have a pocket 10 for receiving a bag 2. The entrainment elements 9 are fastened obliquely on the chain 8, so that at the taut tie they are inclined in the required position for the desired scaling type.

The chain 8 is driven by a servo motor at a speed whereby the speed component of the entrainment elements 9 and pockets 10 in horizontal direction corresponds to the speed of the outgoing conveyor belt 6.

The periphery of the first sprocket wheel 37a at its uppermost point is located at the height of the incoming conveyor belt 5. Here the entrainment elements 9 on the first sprocket wheel 37a are guided so that they lift the bags 2 and swing them in the required slanted position. Subsequently the bags 2 are deposited already as batches 11 on the outgoing conveyor belt 6, whereby the entrainment element 9 project outward in longitudinal direction of the gaps between two bags 2. The previously created strand formation 11 is thereby maintained. In this position eah bag 2" lies with a substantial portion under the respectively preceding bag 2'. A free fly or fall of the bags 2 does not occur in this case.

The chain 8 is supported swingably about the horizontal axis of the second sprocket wheel 37b, so that it can be removed downwards from the conveyor belts 5, 6, to the extent that the entrainment elements 9 no longer engage the bags 2. In a sufficiently downwards removed position of the chain 8, the scaling wheel 27 is brought into engagement with the bags 2 as a second scaling means instead of the chain 8, which makes possible a controlled conventional scaling, whereby a following bag lies on top of the respectively preceding bag. It is thereby possible to use a single drive and a single control system fo both scaling means 8, 27, since the process is the same at least in essence.

In order to form a gap between the individual bag batches 11 the device operating with the scaling wheel 27 is subsequently closer described. By means of a sensor or detector, for instance a light barrier, the supplied or scaled bags 2 are counted in a counting device. When the desired number of bags 2, which can be programmed at will, the compensating conveyor belt 3 with the one before last and the last bags 2 of the just created batch 11 is accelerated. Subsequently the compensating conveyor belt 3 with the first and second bag 2 of the next strand 7 [sic] is slowed down. Independently therefrom, the incoming conveyor belt 5 runs continuously at a constant speed. This way on the incoming conveyor belt 5 a gap is created between the last bag 2 of the just formed batch 11 and the first bag 2 of the next batch 11.

Since the last two bags 2 of the just formed batch 11 have a smaller distance to respectively preceding bag 2 due to the previous acceleration of the compensating conveyor belt 3, the speeds of the chain 8 and of the outgoing conveyor chain 6 are increased, in order to receive the last two bags 2. This increased speed of the chain 8 and of the outgoing conveyor belt 6 are maintained even when the previously produced gap reaches the chain 8 via the outgoing conveyor chain 6. Thereby between the bag batches 11 a gap, respectively a time lag is created, which can be used for the various actions of the subsequent process steps. Only when the first bags 2 of the next batch 11 reach the chain 8, the speed of the chain 8 and of the outgoing conveyor belt 6 is reduced to the previous value.

LIST OF REFERENCE NUMERALS 1 cartons
1a carton side
2 packaging bags
2a first bag
2' preceding bag
2" following bag
3 compensating conveyor belt
4 scaling station
5 incoming conveyor belt
6 outgoing conveyor belt
7 transfer point
8 chain
9 entrainment element
10 pockets
11 bag batch
12 intermediate conveyor belt
13 filling conveyor belt
14 filling conveyor
15 filling projection
16 perforated filling belt 17 negative pressure chamber
18 axis
19 guide rollers
20 conveyor belt
21 direction
22 negative pressure chamber
23 axis
24 sloped inlet
25 guide rail
26 lid
27 scaling wheel
28 notches
29 axis
30 gap
31 guide roller
32 rear area
33 guide element
34 inlet rounding
35 projection
36 arm
37 sprocket wheel

What is claimed is:

1. Installation for filling product receptacles (1), particularly cartons, with a predetermined number of products (2), particularly flexible bag packages which can be fed individually to the installation via a feeding conveyor, with a scaling station (4) wherein the products (2) can be overlappingly arranged in a scale-like manner in product batches (11), and with a filling conveyor (14) over which the products (2) can be supplied to product receptacles (1) positioned in a filling station, as well as with a product receptacle conveyor (20) by means of which the product receptacles (1) can be fed to and discharged from the filling station, characterized in that the scaling station (4) has scaling means (8, 27) by means of which the products (2") of a product batch (11) can selectively scaled to lie on top or under the respectively preceding product (2'), and that the filling conveyor (14) comprises means (15, 13) through which the product batches (11) can be selectively fed either vertically or horizontally.

2. Installation according to claim 1, whereby the filling conveyor has a filling projection with a perforated filling belt, by means of which the product batches can be guided from a horizontal into a vertical conveying direction into the product receptacles, characterized in that the filling belt (16) is guided over a negative pressure chamber (17) extending over the entire length of the filling projection (15).

3. Installation according to claim 2, characterized in that the filling projection (15) together with the negative pressure chamber (17) can be swung out of the product receptacles (1) about a horizontal axis (23).

4. Installation according to claim 1, characterized in that the filling conveyor (14) comprises a filling conveyor belt (13) swingable about a horizontal axis (23), through which the product batches (11) can be supplied horizontally to the product receptacles (1).

5. Installation according to claim 1, characterized in that the scaling station (4) comprises an incoming conveyor belt (5) and an outgoing conveyor belt (6) and that in the area of the transfer point (7) between the two conveyor belts (5, 6) delaying means (8, 27) are provided for reducing the speed of the products (2) and means (28, 9) for lifting and/or swinging the products (2) into the required position for scaling.

6. Installation according to claim 5, with at least substantially horizontally incoming and outgoing conveyor belts, characterized in that at the transfer point (7) between the incoming conveyor belt (5) and the outgoing conveyor belt (6) delaying means (27) for decreasing the speed of products (2) and lifting means (27) for lifting of the advancing edge of products (2) in the conveying direction are provided.

7. Installation according to claim 6, characterized in that the delaying means and the lifting means are formed by a scaling wheel (27) which at its periphery has several notches (28) for receiving the advancing product edges.

8. Installation according to claim 7, characterized in that the notches (28) are open outwards in radial and/or tangential direction.

9. Installation according to claim 7, characterized in that the scaling wheel (27) is rotatable about an axis which is at least approximately parallel to the axes of the guide rollers of the conveyor belts (5, 6).

10. Installation according to claim 7, characterized in that the scaling wheel (27) is arranged above the conveyor belts (5, 6).

11. Installation according to claim 10, characterized in that the distance between the scaling wheel (27) and the conveyor belts (5, 6) is variably adjustable.

12. Installation according to claim 7, characterized in that the scaling wheel (27) is driven particularly by an essentially separate control and adjustment drive, so that the peripheral speed ranges between the conveying speeds of the incoming conveyor belt (5) and the outgoing conveyor belt (6).

13. Installation according to claim 7, characterized in that two to eight, preferably three notches (28) are arranged in the same direction evenly distributed over the periphery of the scaling wheel (27).

14. Installation according to claim 7, characterized in that the notches (28) are at least substantially tangentially arranged on the periphery of the scaling wheel (27), and that the outer diameter of the scaling wheel (27), in an area (32) between two notches (28), increases continuously from the radially inner limit of a notch (28) to the radially outer limit of the neighboring notch (28).

15. Installation according to claim 7, characterized in that the scaling wheel (27) has a smaller width than the products (2).

16. Installation according to claim 15, characterized in that above the outgoing conveyor belt (6), on one or both frontal sides next to the scaling wheel (27), a guide elements (33) is arranged as a stop for an edge of the product (2) laterally projecting beyond the scaling wheel (27).

17. Installation according to claim 16, characterized in that at the rear end of the guide element (33) considered in the transport direction of the products (2), a downward pointing projection (35) is provided.

18. Installation according to claim 6, characterized in that the incoming conveyor belt (5) and/or the outgoing conveyor belt (6) are swingable about a substantially horizontal axis remote from the transfer point (7).

19. Installation according to claim 6, characterized in that the delaying means (27) and the lifting means (27) are slidably and/or swingably arranged in such a manner that they can be removed from the area of the transfer point (7).

20. Installation according to claim 5, with incoming and outgoing conveyor belts running at least substantially horizontally, characterized in that in the area of the transfer point (7) between incoming conveyor belt (5) and outgoing conveyor belt (6) delaying means (8) for reducing the speed of products (2) and lifting means (8) for lifting the trailing edge of the product (2) in conveying direction are provided.

21. Installation according to claim 20, characterized in that the delaying means and the lifting means are formed by at least one revolving traction means (8), on which several outwards directed entrainment elements (9) are arranged, which between them form pockets (10) for receiving the products (2).

22. Installation according to claim 21, characterized in that the entrainment elements (9) are arranged at an acute angle to the surface of the traction means (8), whereby the pockets (10) are inclined in the direction from which the products (2) are fed by the incoming conveyor belt (5).

23. Installation according to claim 21, characterized in that the entrainment elements (9) are detachably fastened to the traction means (8).

24. Installation according to claim 21, characterized in that the traction means (8) is a chain (8) revolving around two sprocket wheels (37a, 37b).

25. Installation according to claim 24, characterized in that the chain (8) runs at an angle from the first sprocket wheel (37a), arranged at the transfer point (7) between the incoming conveyor belt (5) and the outgoing conveyor belt (6), obliquely downwards in the transport direction of the products (2) towards the second sprocket wheel (37b).

26. Installation according to claim 22, characterized in that the angle of the entrainment elements (9) and/or of the chain (8) are adjustable.

27. Installation according to claim 21, characterized in that the traction means (8) are driven particularly by a separately controlled or adjustable drive, so that the speed component of the entrainment elements (9) and pockets (10) in horizontal direction corresponds to the speed of the outgoing conveyor belt (6).

28. Installation according to claim 21, characterized in that from 10 to 50 entrainment elements, preferably 20 entrainment elements (9) are evenly distributed over the traction means (8).

29. Installation according to claim 20, characterized in that the delaying means and the lifting means are formed by at least one scaling wheel located underneath the conveyor belts, which has several notches for receiving the advancing edge of the product arranged at its periphery.

30. Installation according to claim 25, characterized in that the periphery of the first sprocket wheel (37a), respectively the periphery of the scaling wheel at its uppermost point, is located at least approximately at the height of the incoming conveyor belt (5).

31. Installation according to claim 21, characterized in that the axes about which the traction means (8) revolves, respectively about which the scaling wheel rotates, are at least approximately parallel to the axes of the guide rollers of the conveyor belts (5, 6).

32. Installation according to claim 21, characterized in that on both sides of each of the conveyor belts (5, 6) a traction means (8), respectively a scaling wheel is arranged, which can seize the edges of the product (2) laterally protruding beyond the conveyor belts (5, 6).

33. Installation according to claim 20, characterized in that the incoming conveyor belt (5) and/or the outgoing conveyor belt (6) is swingable about a substantially horizontal axis remote from the transfer point (7).

34. Installation according to claim 20, characterized in that the delaying means (8) and lifting means (8) are arranged slidably and or swingably so that they can be removed from the area of the transfer point (7).

35. Installation according to claim 1 characterized in that between the feeding conveyor and the scaling station (4) a compensating conveyor belt (3) is provided.

36. Installation according to claim 35, characterized in that the compensating conveyor belt (3) is at least twice as long as the product (2).

37. Installation according to claim 1, characterized in that between the scaling station (4) and the filling conveyor (14) an intermediate conveyor belt (12) is provided.

38. Installation according to claim 5, characterized in that the intermediate conveyor belt (12) and the outgoing conveyor belt (6) are together at least as long as the length of a product batch (11).

39. Installation according to claim 1, characterized in that the product receptacle conveyor (20) is arranged so that the transport direction of the product receptacles (1) corresponds to the product flow direction (21) in the installation.

40. Installation according to claim 1, characterized in that the conveyor (20) and the conveyor belts (3, 12, 13, 16) as well as the driven means (5, 6, 8, 27) of the scaling station (4) are each driven individually or in pairs by separate drives, particularly by servo motors.

41. Installation according to claim 1, characterized in that at least two independently drivable filling paths arranged next to each other are provided with a feeding conveyor, a scaling station (4), a filling conveyor (14) and product receptacle conveyor (20).

42. Process for filling product receptacles (1), particularly cartons, with a predetermined number of products (2), particularly flexible bag packages, which are fed individually at regular or irregular intervals and are arranged to overlap in a scale-like manner to form a product batch (11), and which subsequently are filled into a prepared product receptacle (1), particularly with an installation according to claim 1, characterized in that the products (2") of a product batch (11) can be selectively positioned on top or under the respectively preceding product (2'), and that the product batches (11) can be selectively fed to the product receptacles (1) either vertically or horizontally.

43. Process according to claim 42, characterized in that the products (2) of a product batch (11) are scaled so that a product (2") lies on top of the respectively preceding product (2') and the products (2) of a product batch (11) are fed horizontally to the product receptacles (1).

44. Process according to claim 42 for the formation of a product strand (11) of several products (2), which are fed individually by an incoming conveyor belt (5) and deposited on top of each other overlappingly in a scale-like manner on an outgoing conveyor belt (6) and delivered as a product strand (11), whereby for the formation of a product strand (11) the outgoing conveyor belt (6) is driven at a lower speed than the incoming conveyor belt (5), and whereby for the formation of a gap (30) between two product strands (11) the outgoing conveyor belt (6) is driven at a higher speed, characterized in that the speed of the products (2) is reduced at the transfer point (7) between the incoming conveyor belt (5) and the outgoing conveyor belt (6), that at the transfer point (7) between the incoming conveyor belt (5) and the outgoing conveyor belt (6) the advancing edge of the product (2) in the transoport direction is lifted and/or the trailing edge of the product (2) in transport direction is lowered, that the products (2") are brought in this position over a part of the respectively preceding product (2'), and that the products (2") are subsequently deposited on the respectively preceding product (2').

45. Device according to claim 42, characterized in that the products (2) of a product batch (11) are scaled in such a manner that a product (2") lies under the respectively preceding product (2') and the products (2) of a product batch (11) are fed vertically to the product receptacles (1).

46. Process according to claim 42 for the formation of a product strand (11) of several products (2), which are fed individually by means of an incoming conveyor belt (5) and are deposited overlappingly in a scale-like manner on an outgoing conveyor belt (6) and discharged as a product strand (11), whereby for the formation of a product strand (11) the outgoing conveyor belt (6) is driven at a speed lower than the speed of the incoming conveyor belt (5) and whereby for the formation of a gap (30) between two product strands (11) the outgoing conveyor belt (6) is driven at a higher speed, characterized in that the speed of the products (2) is reduced at the transfer point (7) between the incoming conveyor belt (5) and the outgoing conveyor belt (6), that at the transfer point (7) between the incoming conveyor belt (5) and the outgoing conveyor belt (6) the trailing edge of the product (2) in the transport direction is lifted and/or the advancing edge of the product (2) in the transport direction is lowered, that the products (2") are brought in this position under a portion of the respectively preceding product (2') and that subsequently the products are deposited on the outgoing conveyor belt (6).

* * * * *